A. JOHNSON.
CONTAINER-TRANSFER FOR PRESSURE COOKERS AND COOLERS.
APPLICATION FILED JUNE 2, 1920.
1,389,447.
Patented Aug. 30, 1921.
5 SHEETS—SHEET 1.
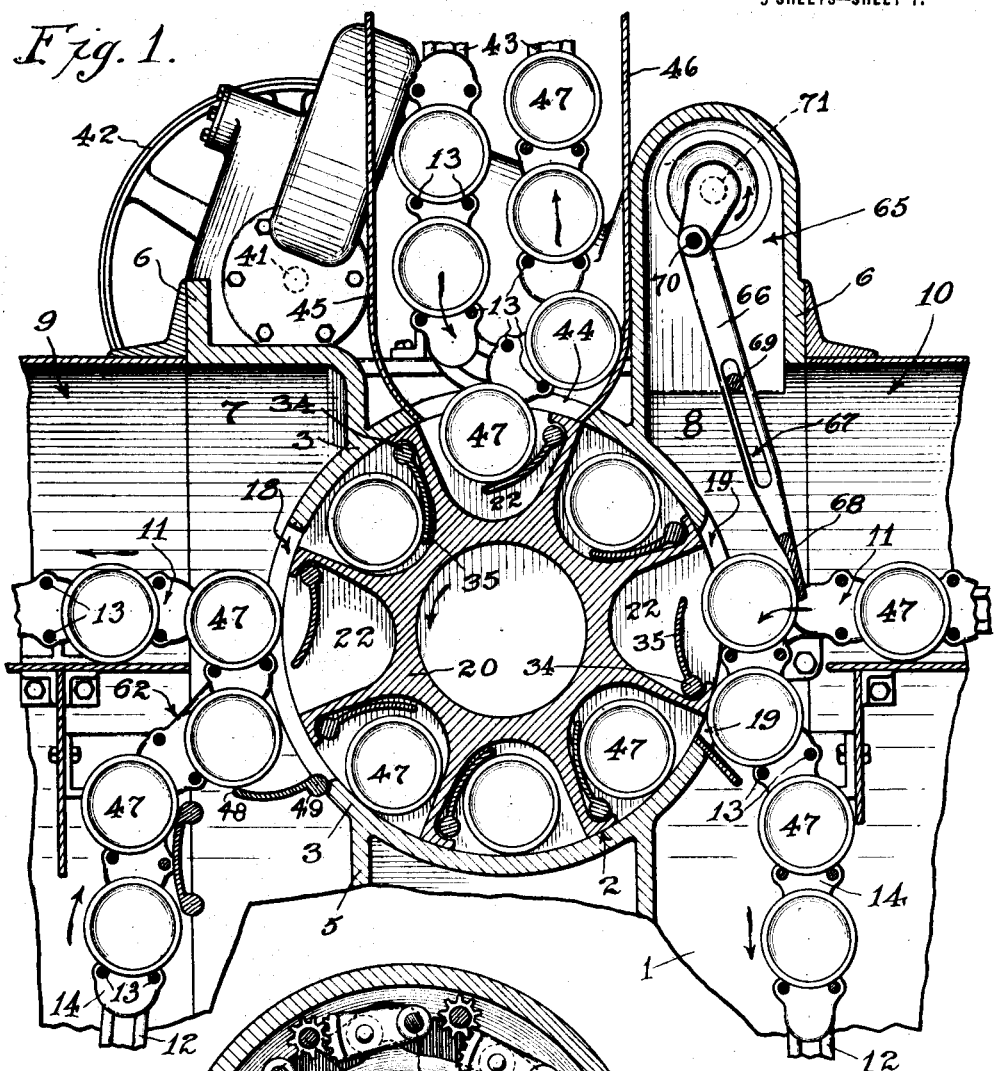
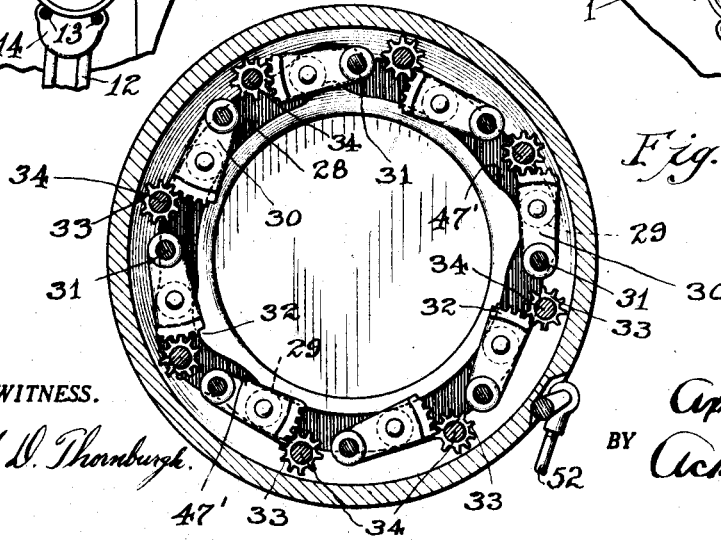
WITNESS.
J. D. Thornburgh.
INVENTOR.
Axel Johnson
BY Acker & Totten
ATTORNEYS

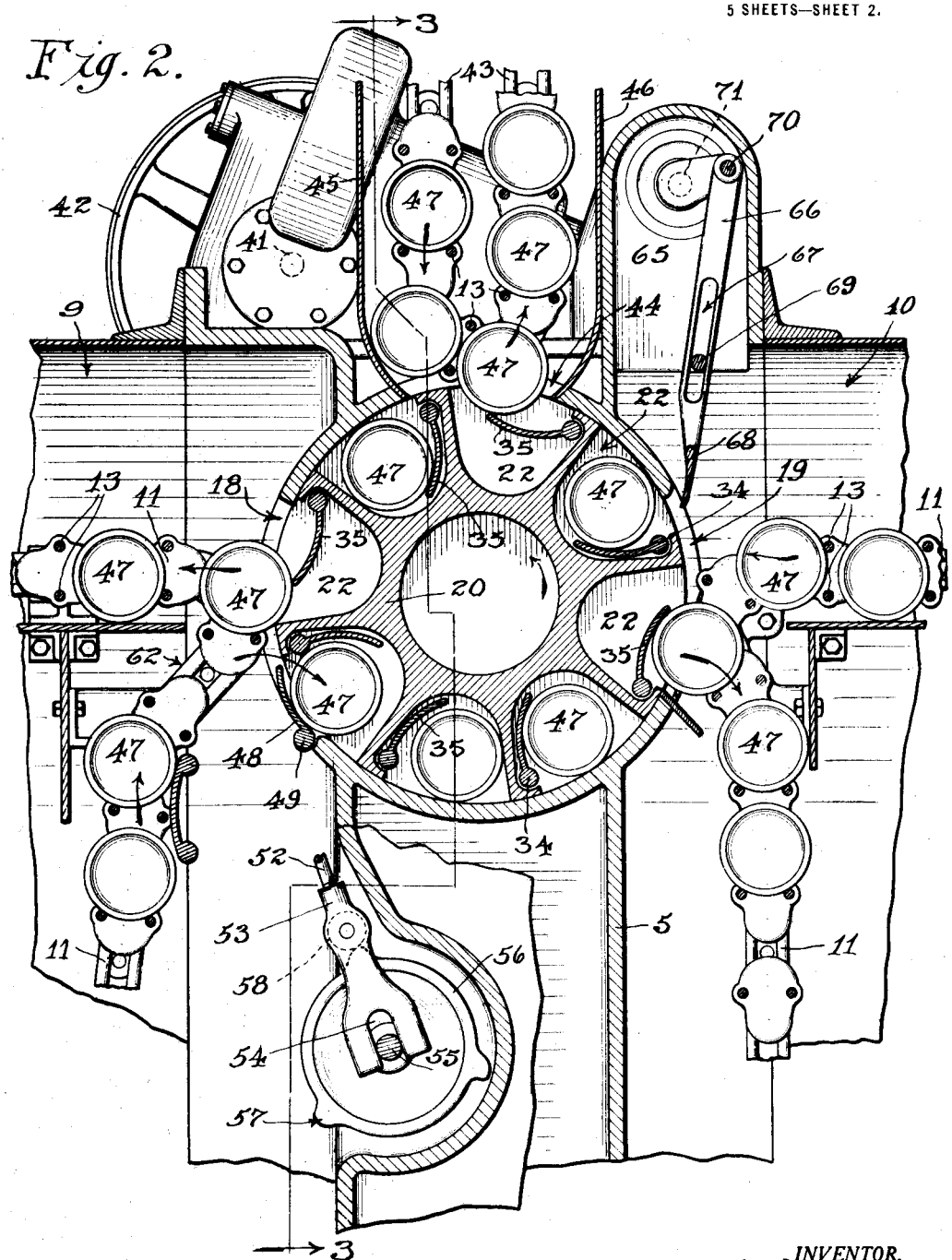

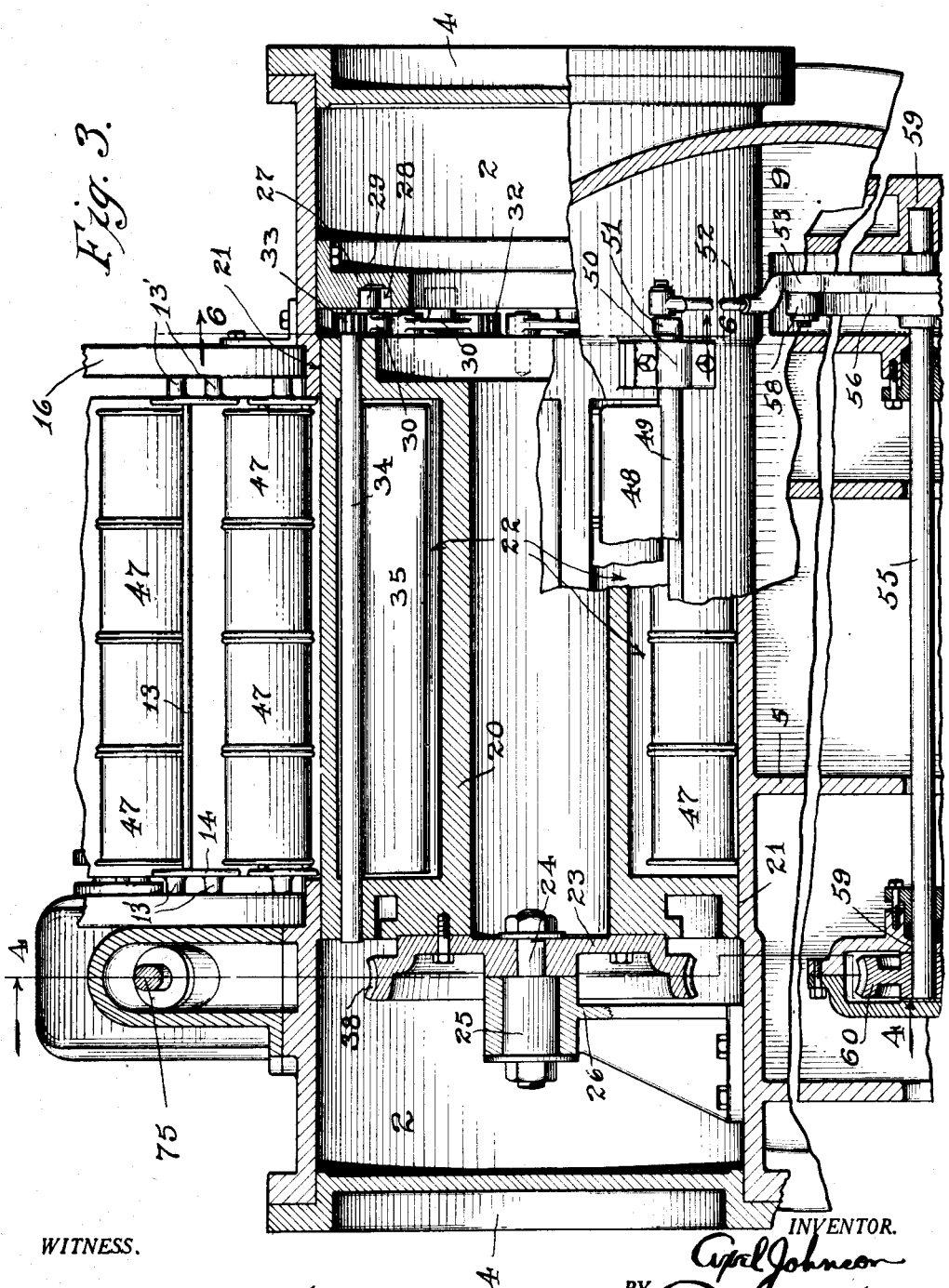

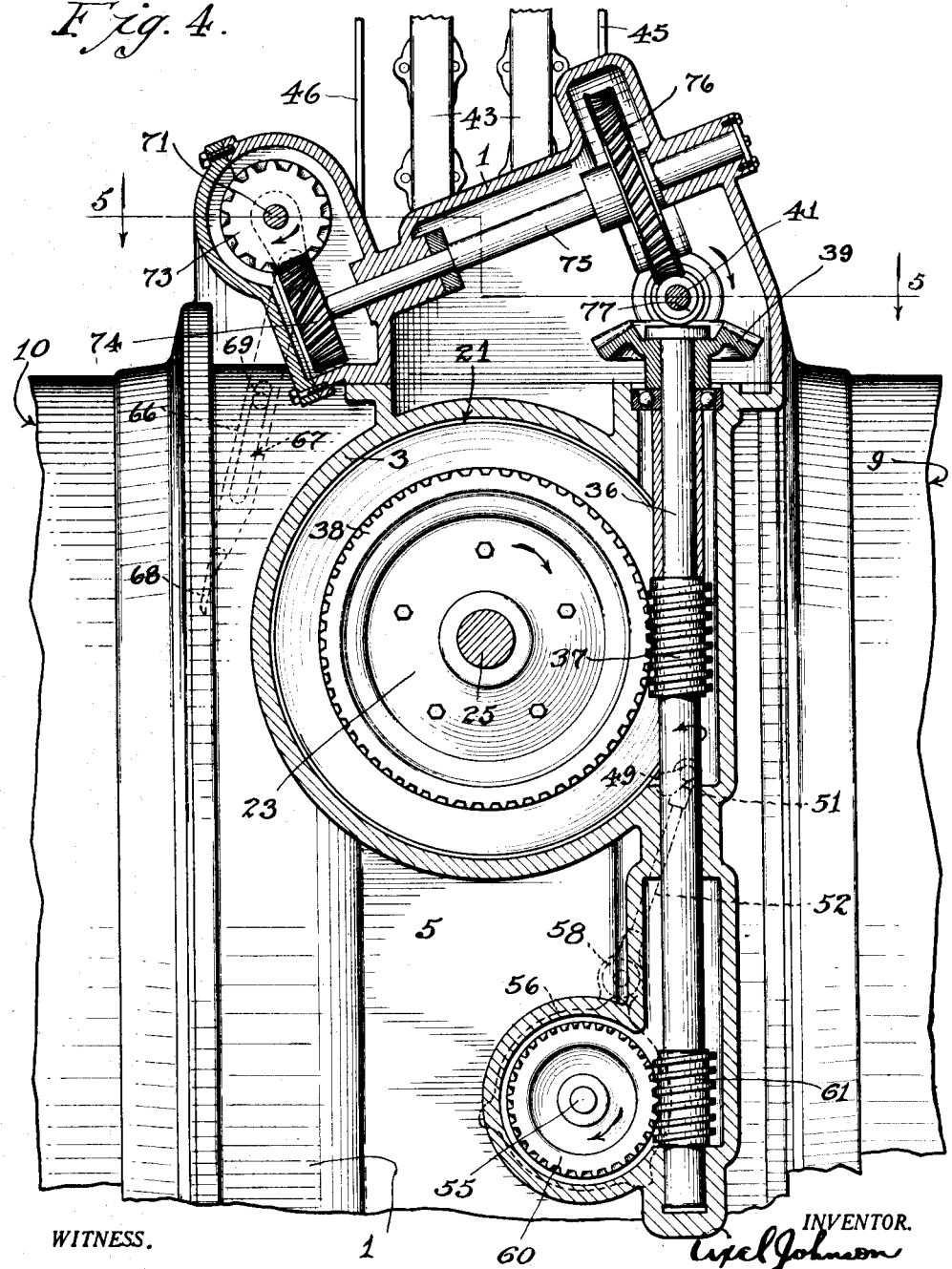

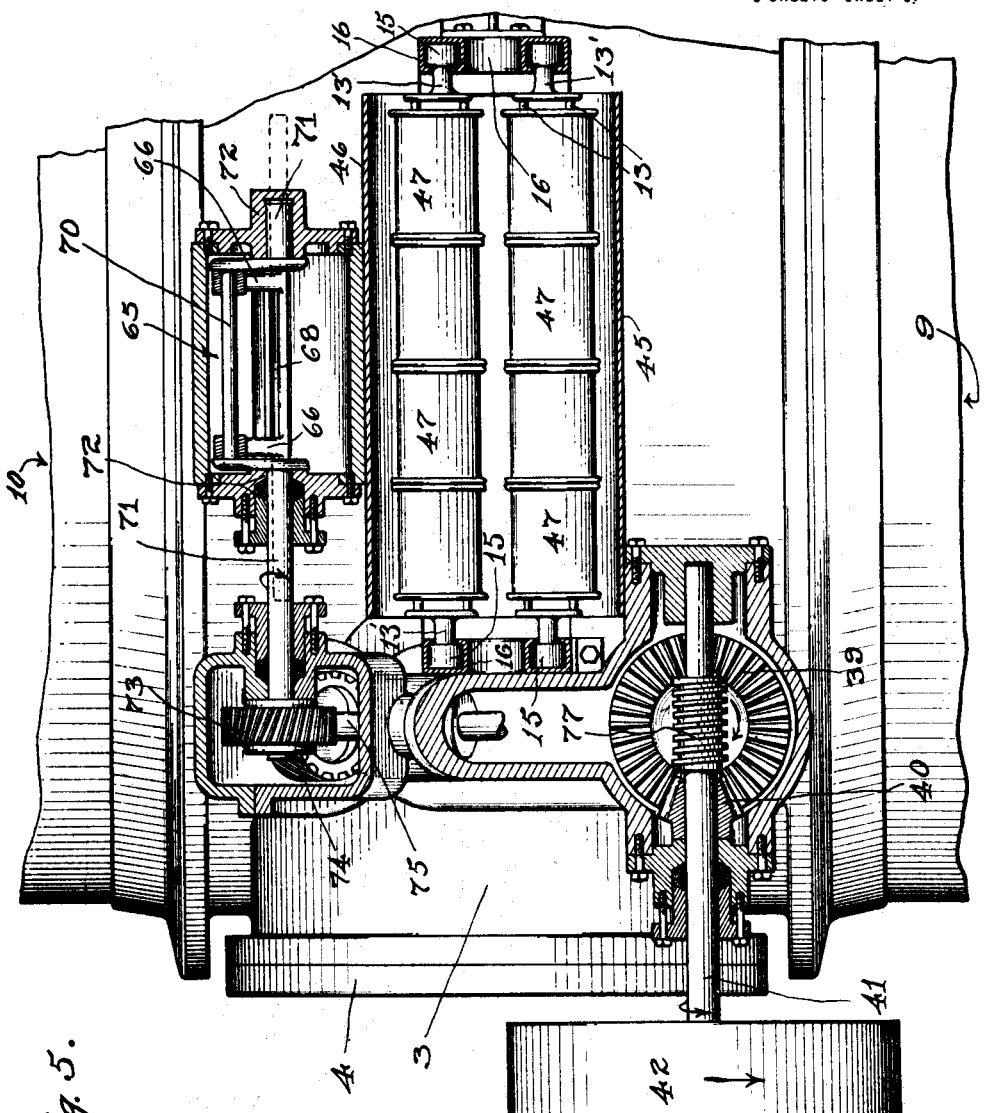

UNITED STATES PATENT OFFICE.

AXEL JOHNSON, OF OAKLAND, CALIFORNIA.

CONTAINER-TRANSFER FOR PRESSURE COOKERS AND COOLERS.

1,389,447. Specification of Letters Patent. Patented Aug. 30, 1921.

Application filed June 2, 1920. Serial No. 385,940.

*To all whom it may concern:*

Be it known that I, AXEL JOHNSON, a citizen of the United States, residing at Oakland, in the county of Alameda and State of California, have invented certain new and useful Improvements in Container-Transfers for Pressure Cookers and Coolers, of which the following is a specification.

The present invention relates to a mechanism primarily designed for receiving successive articles from a delivery and discharge means and for conveying the same to an endless conveyer which returns them to the receiving means, which in turn transfers the articles to a second conveyer, and from which they are again returned to the receiving means which delivers them to the feed and discharge conveyer.

The principal object of the present invention is to provide what may be termed a transfer valve construction for use in connection with pressure cookers and coolers of the type illustrated in my co-pending application, Serial Number 277,384, filed February 17, 1919, and by the employment of which a single transfer member is so positioned as to coöperate with the respective receptacles as fed into the apparatus, and which transfer member delivers the articles to one conveyer, receives the articles from said conveyer after they have passed through one chamber and transfers them to the conveyer of the other chamber, subsequently receiving them from this conveyer after having passed through its associated chamber and discharging the same from the apparatus without exposing the articles to the atmosphere in their transfer from one chamber to another, and without providing a direct communication between either of the chambers to the atmosphere during the operation. A further object is to provide a construction wherein the transfer mechanism and its associated working elements are mounted in a separate casting adaptable for positioning intermediate corresponding or adjacent ends of cooking and cooling chambers, thereby adapting the invention to the type of construction illustrated in my heretofore mentioned application.

In the drawings,—Figure 1 is a vertical sectional view of the preferred embodiment of my invention with the parts illustrated in a position wherein the transfer member is receiving a receptacle or container from each of the conveyers.

Fig. 2 is a view similar to Fig. 1 with the parts illustrated in a position wherein the transfer member is delivering a receptacle or container to each of the conveyers.

Fig. 3 is a vertical sectional view taken on line 3—3 of Fig. 2.

Fig. 4 is a sectional view taken on line 4—4 of Fig. 3.

Fig. 5 is a sectional view taken on line 5—5 of Fig. 4.

Fig. 6 is a sectional view taken on line 6—6 of Fig. 3.

In the drawings, wherein like characters of reference designate corresponding parts, 1 indicates a suitable valve casting formed with a cylindrical chamber 2 horizontally disposed therein and surrounded by a suitable wall 3, the chamber being closed at its ends by suitable end plates 4. From opposite sides of the chamber 2, and connected with the walls 3 thereof, extend the wall members 5 preferably flanged at their edge, as at 6, providing shells 7 and 8 at opposite sides of the valve chamber 2 and with each of which coöperates the respective chambers 9 and 10, the chamber 9 being any suitable conventional form of cooking chamber, and the chamber 10 being any suitable form of cooling chamber. The edges of the chamber forming walls are secured in any suitable manner to the flanges 6 of the chambers 7 and 8. Within each chamber 9 and 10 is provided a suitable endless receptacle conveyer, a portion of each of said conveyers being particularly illustrated in Figs. 1 and 2 of the drawings, and each consists preferably in a horizontal flight 11 and a vertical flight 12, which are interconnected, forming complete endless conveyers in the respective chambers. The respective conveyers are formed with the transversely disposed conveyer bars 13, on which the receptacles rest, and which are secured at their ends to end plates 14, said plates carrying on their extremities a pair of members 13' receivable at their ends in heads 15 operating in grooved tracks or rails 16, the heads 15 in the respective tracks or rails being separated by the contact of adjacent edges of the end plates 14.

Each of the conveyers 11 at the point of intersection of the vertical and horizontal flights thereof approach closely to opposite sides of the valve chamber wall 3 and at said points the wall is provided with suitable port openings 18 and 19 of a length equal to the width of the respective conveyers 11, as illustrated in the drawings. The conveyers 11 are operated in the direction of the arrows, Figs. 1 and 2, in timed relation with the transfer member and other associated instrumentalities by any suitable mechanism of any well known type, no particular form being illustrated in the present disclosure.

Within the valve chamber 2 is rotatably mounted a horizontally disposed transfer valve 20 of a length less than that of the chamber 2, as illustrated in Fig. 3 of the drawings, and the periphery of said valve is adapted to contact with and bear on the inner surfaces of the annular valve supporting flanges 21 disposed at opposite ends of the respective openings 18 and 19 and particularly illustrated in Fig. 3 of the drawings. The valve 20 is provided on its periphery with a plurality of receptacle chambers 22 of a length corresponding to the openings 18 and 19 and of a depth and size sufficient to receive a row of receptacles to be transferred in the apparatus.

The valve 20 at one end carries a plate 23 into which passes a suitable bolt 24 forming a bearing, the bolt having an enlarged surface 25 which is received in a bearing 26 positioned within the chamber 2 adjacent one end, this construction precluding longitudinal movement of the valve 20 in one direction within its chamber 2. Within the opposite end of the chamber 2 is positioned a suitable ring 27, the same in its face adjacent the valve end being provided with a cam groove 28, Figs. 3 and 6 of the drawings. In this cam groove operate a plurality of rollers 29, each carried on a lever 30 fulcrumed as at 31 to the end of the valve, and said levers, at their outer ends, being provided with racks 32 engaging pinions 33 on the ends of shafts 34, each of said shafts extending longitudinally within one of the chambers 22 adjacent the terminal edge of its side wall, as in Figs. 1 and 2 of the drawings. The ring 27 precludes longitudinal movement of the valve 20 in one direction within the chamber 2, thus confining the same in its rotation between the inner face of the ring 27 and the surface of the bearing bracket 26.

Carried by each of the shafts 34, within the respective chambers 22, and disposed to normally lie in contact with one of the inner side walls of the chambers, with its free end slightly curved, is a plate 35, designed primarily for ejecting the receptacles at predetermined timed intervals from the respective chambers for the hereinafter described purpose.

Rotation is imparted to the valve 20 to operate the same in the direction of the arrows by a suitable vertically disposed shaft 36 carrying a worm 37 which engages with a worm gear 38 formed on the periphery of the disk 23, Fig. 3 of the drawings, and said shaft 36 at its upper end carries a beveled gear 39 driven by a bevel pinion 40 on a power shaft 41 preferably disposed at right angles to the shaft 36 and extending horizontally from one end of the casting 1, said shaft 41 being provided with a band wheel 42 on its outer free end, as in Fig. 5 of the drawings, for receiving power transmitted thereto to rotate the shaft in the direction of the arrow, Fig. 5 of the drawings.

Receptacles to be transferred by the valve 20 are fed to and removed from the valve casing 1 at a point intermediate the openings 18 and 19 by a vertically disposed endless conveyer 43 similar to the conveyers 11 in the chambers 9 and 10, and said conveyer 43 at its point of connection between parallel flights thereof communicates with the interior of the chamber 2 through a receptacle feed and discharge opening 44. This conveyer, like the conveyers 11, is operated, in the direction of the arrows, in timed relation with the rotation of the valve 20 by any suitable form of mechanism, not shown in the drawing. The receptacles carried by said conveyer 43 are confined between suitable guide plates 45 and 46 connecting at their lower ends with the side edges of the opening 44, as in Figs. 1 and 2 of the drawings. The distance between the side edges of the opening 44 and the adjacent edges of the respective openings 18 and 19 is slightly greater than the width from top to bottom of the openings of the respective chambers 22 so that no direct communication is had between the respective openings 19 and 44 and 44 and 18 through the respective chambers 22.

The cam surfaces 47' of the groove 28 are so arranged as to cause a quick pivoting of the plates 35 therein as the respective receptacle chambers 22 register with the respective openings 18, 19 and 44, so that the receptacles contained within the chambers will be quickly discharged therefrom onto the respective conveyers and permitting the feeding of different receptacles from the conveyers and to be received within the chambers from which the receptacles were just previously discharged.

To more fully comprehend this action, reference is directed particularly to Figs. 1 and 2, wherein the row of receptacles 47 from the conveyer 43 have been discharged from their supporting rods 13 on the passage of the end plates thereof from one flight of the conveyer to the other, and are partially received within one of the chambers 22, the return of the plate 35 to the base of the chamber arresting the downward movement of the row of receptacles 47. After being fully received within the chamber 22, the row of receptacles 47, as in Fig. 2 of the drawings, is gradually transferred by the rotation of the valve 20 from the opening 44 to the opening 18, at which time the plate associated with the chamber containing the row of receptacles 47 is swung outwardly to discharge the row of receptacles 47 onto the rods 13 of one of the sections of the conveyer 11 in the cooking chamber. This discharge action provides a vacant chamber which on the continued movement of the valve 20 is supplied with a row of receptacles from the cooking chamber conveyer 11, and said row of receptacles is assisted from the rods 13 of the cooking chamber conveyer by the following mechanism.

Pivoted to swing on a horizontal axis at the lower edge of the opening 18 is a feed plate 48, Figs. 1, 2 and 3 of the drawings. The plate 48 is mounted on a shaft 49 fulcrumed at its ends in bearings 50, the end of said shaft carrying a crank portion 51 to which is pivotally connected one end of an operating rod 52, said rod at its lower end carrying a casting 53 forked at its terminal end as at 54. The forked terminal end 54 of the casting 53 straddles a shaft 55 disposed transversely of the valve casting 1 below and at one side of the valve 20, as in Figs. 2 and 3 of the drawings.

The shaft 55 carries a disk 56 having cam surfaces 57 which are adapted on the rotation of the disk to coact with a cam roller 58 on the casting 53 and impart a swinging movement to the plate 48 through the rod 52. The shaft 55 is supported in suitable bearings 59 and at its end removed from the disk 56 carries a worm gear 60 which intermeshes with and is driven in the direction of the arrow, Fig. 4, by a worm 61 on the shaft 36. The swinging of the plate 48 by the rotation of the shaft 55, which is operated in timed relation with the movement of the conveyer 11 in the chamber 9 and with the rotation of the valve 20, receives a row of receptacles or containers as the same arrive at the offset point 62 of the vertical flight of said conveyer 11, and during its swinging movement said plate 48 deposits the receptacles into the unoccupied chamber 22 of the valve 20.

The delivering of the receptacles from the offset portion 62 of the vertical flight of the conveyer 11 in the chamber 9 is made possible owing to the receptacles resting on the bars or rods 13, and these rods in their path of travel assuming a position transverse to the grooves 16 at said offset portion.

The receptacles as transferred by the valve 20 from the chamber 9 to the chamber 10 are discharged from their respective chambers on the chamber arriving in register with the opening 19, this discharging action being accomplished by the formation of the cam groove 28 which causes a swinging of the ejector plates 35 outwardly as the respective chambers successively register with said opening 19. The processed containers or receptacles as discharged from the respective chambers, are deposited onto the bars or rods 13 of the conveyer 11 in the chamber 10 as the bars arrive at the upper end of the vertical flight of said conveyers and rest thereon during their travel through the pressure cooling chamber 10 until they are returned to the terminus of the horizontal flight adjacent the opening 19. When in this position the chambers 22 from which receptacles have been previously discharged are immediately re-supplied with receptacles in a cooled condition and which have been conveyed through the chamber 10, the mechanism for performing said operation being preferably constructed as follows:—

Immediately above the opening 19 in the wall of the valve casting 1, I provide a pocket 65 communicating at its lower end with the interior of the chamber 10, and mounted in the pocket is a suitable frame member, the legs 66 of which are longitudinally slotted as at 67 adjacent the lower end. Connecting the lower ends of the legs 66 is a suitable blade 68 adapted for movement in an ovular path to and from the forward end of the horizontal flight of the conveyer 11 in the chamber 10. The legs 66 in the downward movement of the blade 68 are adapted to be inclined rearwardly as in Fig. 1 of the drawings, and said blade on reaching its lowermost point of travel is adapted to pass in rear of the receptacles at the forward end of the horizontal flight of the conveyer 11, in chamber 10 and to advance said receptacles at a speed slightly faster than the travel of the conveyer 11, moving the receptacles from their supporting rods 13 to a position to rest on the supporting rods 13 in advance thereof, which have passed from the horizontal flight on to the vertical flight of said conveyer 11 in the chamber 10, this position being illustrated in Fig. 1 of the drawings.

The continued forward movement of the blade 68 removes the receptacles from their supporting rods 13 and deposits the same into the empty chamber 22 from which has just been delivered receptacles to the vertical flight of the conveyer 11 of the chamber 10, this action taking place on the rearward movement of the blade 35 in the empty chamber 22. The continued movement of the blade 68 after delivering the receptacles to the chamber 22 is in an upward and rearward direction, as illustrated in Fig. 2 of the drawings. The mechanism for operating and controlling the movement of the blade 68 and its associated legs 66 comprises a horizontally disposed rod 69 extending transversely of the pocket 65, and through the slot 67 in the legs providing a fulcrum for the frame. The upper ends of the legs 66 are fulcrumed to rotate about a crank frame 70 supported on a shaft 71 rotatable in bearings 72 and said shaft at its end carries a worm gear 73 driven in the direction of the arrow, Fig. 4, by a worm gear 74 on a rotatable shaft 75, one end of which extends over the shaft 41 and carries a worm gear 76 which is driven by a worm pinion 77 on the said shaft 41, as illustrated in Fig. 4 of the drawings.

It will be apparent from the description and an examination of the drawings, that power applied to the band wheel 42 drives the shafts 41, 36, 55 and 75 in unison, and at their proper speeds to obtain a proper working of the apparatus with all parts operating in timed relation relatively to each other.

The receptacles as delivered to the chamber 22 by the blade 68 are elevated by a rotation of the valve 20 until they register with the inlet and discharge opening 44, at which time the member 35 of the chamber in register with said opening is operated by the formation of the cam groove 28 to raise the receptacles from their associated pocket or chamber and into the path of the conveyer 43, the discharged receptacles being received between the unoccupied rods 13 of the conveyer section, from between which receptacles were delivered to a preceding chamber immediately before the present discharge operation takes place.

I claim:—

1. In combination with a pair of endless conveyers and an endless article feed conveyer arranged with portions of said conveyers, lying adjacent to each other, a mechanism interposed in coöperative relation with said conveyers for receiving an article from said feed conveyer and for delivering the same to one of said pair of conveyers and for receiving the article delivered to said conveyer and for subsequently delivering the same to the other of said pair of conveyers.

2. In combination with a pair of conveyers and an article feed conveyer arranged adjacent to each other, and a mechanism interposed between and common to all of said conveyers for receiving an article from said feed conveyer and for conveying the same to and delivering it to one of said pair of conveyers and for receiving the article delivered to said conveyer and for subsequently delivering the same to the other of said pair of conveyers.

3. In combination with a pair of conveyers and an article feed conveyer arranged adjacent to each other, and an article transfer mechanism interposed between said conveyers, the same comprising a rotary member coöperating with and common to all of said conveyers for receiving an article from said feed conveyer and for transferring the same to one of said pair and for receiving the article delivered to the conveyer of said pair and for delivering the same to the other conveyer of said pair.

4. In combination with a pair of conveyers and an article feed and discharge conveyer arranged adjacent to each other, and an article carrier mechanism interposed between said conveyers, the same comprising a rotatable member common to all of said conveyers for receiving an article from said feed and discharge conveyer and for transferring the same to one of said pair of conveyers and for receiving the article delivered to the conveyer of said pair and for transferring the same to the other conveyer of said pair and subsequently for receiving the article from said last mentioned conveyer and for transferring the same to the feed and discharge conveyer for conveying away from said carrier mechanism.

5. In combination with a rotatable carrier, a plurality of conveyers arranged at a spaced points about the periphery thereof, each adapted for delivering an article to said rotatable carrier and receiving an article therefrom, and means for rotating said carrier.

6. In combination with a rotatable carrier, a plurality of endless article conveyers arranged at spaced points about the periphery thereof and extending radially therefrom, said conveyers moving to and from said carrier and each adapted to deliver an article to said carrier and for receiving an article therefrom.

7. In combination with a rotatable carrier, provided with a plurality of article seats disposed circumferentially thereof, a plurality of article conveyers arranged at spaced points about the periphery thereof and each formed with article seats adapted to coöperate with the article seats of said rotatable carrier, means for transferring articles from said carrier seats to said conveyer seats, and means for transferring articles from certain of said conveyer seats to said carrier seats whereby on the movement of said conveyers to and from said carrier each is adapted to deliver an article to said carrier and to receive an article therefrom.

8. In combination with a plurality of pressure chambers each having an endless article conveyer therein, a valve chamber between said pressure chambers and formed with an opening communicating with each pressure chamber adjacent said conveyers, a rotatable valve within said valve chamber provided with pockets for registering with said valve chamber openings leading to said pressure chambers, an article feed and discharge conveyer communicating with said valve through an opening in the valve casing intermediate said openings leading to said pressure chambers, and means for rotating said valve to transfer an article from said article feed and discharge conveyer to the conveyer of one of said chambers, and from one of said chambers, to the other of said chambers, and from said latter chamber to the feed and discharge conveyer.

9. In combination with a plurality of pressure chambers, of single means for feeding articles to and removing the same from said pressure chambers and for transferring said articles from one chamber to the other without affording a direct communication between said chambers or between either of said chambers and the atmosphere.

10. In combination with a plurality of pressure chambers, of single means for feeding articles to and removing the same from said pressure chambers and for transferring the articles from one chamber to the other intermediate the feed and discharge apparatus without affording a direct communication between said chambers or between either of said chambers and the atmosphere.

11. In combination with a plurality of pressure chambers, a valve chamber therebetween and formed in its wall with a port communicating with each chamber and formed with a port leading to the atmosphere, said ports providing a communication between said chambers and from the chambers to the atmosphere, a carrier valve within said valve chamber interrupting the direct communication between said chambers and from the chambers to the atmosphere, said valve formed with a plurality of pockets, an independent conveyer communicating with each valve chamber wall port for receiving articles from and for delivering articles to said valve pockets, means associated with the valve for ejecting the articles from the respective pockets to one of the conveyers on the registering of the pocket with said ports, and means for removing articles from certain of said conveyers and for delivering the same to successive pockets on the registering of the pockets with said ports.

12. A pressure cooking and cooling apparatus consisting of a cooking and cooling chamber, a conveyer within each chamber for receiving an article and for conveying the same therethrough and returning the same to the point of start, a valve chamber separating said cooking and cooling chambers, and provided in its wall surface with a plurality of article passages one communicating with each chamber and another communicating with the atmosphere, an article feed conveyer disposed at a point adjacent to said latter passage and movable to and from the same for delivering articles to and removing articles from said latter passage, and a transfer valve within said chamber adapted for movement therein for transferring articles from one conveyer to another without providing a direct communication between the same.

13. A pressure cooking and cooling apparatus consisting of separate chambers for cooking and cooling articles under pressure, means within each chamber for conveying the articles delivered thereto through the same and for returning the articles to their point of reception within the chambers, a transfer valve chamber intermediate said cooking and cooling chambers and formed in its wall surface with a plurality of article passages one communicating with each chamber and one communicating with the atmosphere, and a transfer means within said chamber adapted for movement therein for transferring articles from one conveyer to another and for transferring the articles from the conveyer lastly receiving the same to said article passage communicating with the atmosphere without providing a direct communication between the chambers or from the chambers to the atmosphere through said passage communicating with the atmosphere.

14. A pressure cooking and cooling apparatus consisting of a pair of separate chambers for cooking and cooling articles under pressure, a valve chamber therebetween and formed in its wall with a port communicating with each chamber, the said ports affording a communication between said chambers, a pocketed carrier valve within said valve chamber interrupting the direct communication between said chambers, an article conveyer within each chamber and each communicating directly with said valve, and means for operating said valve whereby the same receives articles in a continuous stream directly from the conveyer within the cooking chamber and transfers the same to the cooling chamber and delivers the transferred articles in a continuous stream directly to the conveyer therein without affording a direct communication between said chambers.

15. In combination with a chamber, an endless conveyer therein and means for supplying containers to the conveyer at one point in its travel and for receiving containers from said conveyer at a point in its travel immediately in advance of its point of supply without affording a direct connection between the interior of the chamber and the atmosphere.

16. In combination, a pressure chamber provided with a single container inlet and discharge port, a conveyer within the chamber and extending in proximity to said port, and a cased valve communicating with said port for supplying containers through said port to the conveyer at one point and for receiving the containers therefrom through said port at another point without affording a direct communication between the interior of the chamber and the atmosphere.

17. In combination, a pressure chamber provided with a single container inlet and discharge port, a conveyer within the chamber, and a single means for receiving and supplying containers to said chamber and for receiving and conveying containers therefrom through said single port.

18. In combination, a pressure chamber provided with a single port affording a container inlet and discharge, a conveyer within the chamber, and a single rotary valve for supplying containers to said chamber and for receiving and conveying containers therefrom, without affording a direct communication between the interior of the chamber and the atmosphere.

19. In combination, a pressure chamber provided with a container inlet and discharge port, a conveyer within the chamber, a rotary pocketed valve associated with said port and conveyer for successively delivering receptacles to the chamber and for successively receiving receptacles from the chamber without affording a direct communication between the interior of the chamber and the atmosphere.

20. In combination, a pressure chamber, a conveyer therein and a single valve mechanism for successively receiving and delivering containers to the conveyer and for successively receiving and discharging containers therefrom without affording a direct communication between the interior of the chamber and the atmosphere.

21. In combination, a pressure chamber, a conveyer therein, a single valve for successively delivering containers to the conveyer and for receiving containers therefrom for the removal of the same from the chamber without affording a direct communication between the interior of the chamber and the atmosphere, and means coöperating with the valve for delivering containers thereto and for receiving containers therefrom.

22. In combination, a pressure chamber provided with a single container inlet and discharge opening, a conveyer therein communicating with the opening, a single multiple pocketed valve for delivering containers to said conveyer through said opening and for receiving containers from said conveyer through said opening, a case for said valve and within which the same operates, whereby said valve precludes a direct connection between the interior of the chamber and the atmosphere at all times.

23. In combination, a pressure chamber provided with a single opening affording a container inlet and discharge port, a conveyer within the container and communicating with said port, and a single rotary valve coacting with said conveyer through said port for delivering containers to said conveyer and for receiving containers therefrom and discharging the same from the chamber without affording a direct communication with the interior of the chamber and the atmosphere.

24. In combination, a pressure chamber provided with a single opening affording a container inlet and discharge port, a conveyer on each side of said opening, one of said conveyers adapted to propel containers within the chamber and the other to deliver containers to and remove containers from the other conveyer through said port, and means for synchronously operating said conveyers, one of said conveyers precluding a direct communication between the interior of the chamber and the atmosphere.

25. In combination with a plurality of pressure chambers positioned adjacent to each other, of a single valve adapted for operation for feeding articles to and removing the same from said pressure chambers and for transferring the articles from one chamber to another without affording a direct connection between said chambers or between either of said chambers and the atmosphere.

26. In combination with a plurality of independent pressure chambers disposed in communicating relation and each provided with a combined inlet and discharge opening, a valve between said chambers, for transferring receptacles from one chamber to the other, and a feed and discharge conveyer communicating with the valve between said chamber inlet and discharge openings.

In testimony whereof I have signed my name to this specification.

AXEL JOHNSON.